US009353838B2

(12) United States Patent
Ikeda

(10) Patent No.: US 9,353,838 B2
(45) Date of Patent: May 31, 2016

(54) ELECTRIC LINEAR ACTUATOR

(71) Applicant: NTN Corporation, Osaka-shi (JP)

(72) Inventor: Yoshinori Ikeda, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 14/273,690

(22) Filed: May 9, 2014

(65) Prior Publication Data

US 2014/0245848 A1    Sep. 4, 2014

Related U.S. Application Data

(63) Continuation of application No. PCT/JP2012/079311, filed on Nov. 12, 2012.

(30) Foreign Application Priority Data

Nov. 11, 2011    (JP) .................................. 2011-247259

(51) Int. Cl.
*F16H 25/20*    (2006.01)
*F16H 25/22*    (2006.01)
*F16C 33/20*    (2006.01)
(Continued)

(52) U.S. Cl.
CPC ............ *F16H 25/2204* (2013.01); *F16H 25/20* (2013.01); *F16C 17/02* (2013.01); *F16C 33/128* (2013.01); *F16C 33/20* (2013.01); *F16H 2025/2031* (2013.01); *F16H 2025/2081* (2013.01); *Y10T 74/18576* (2015.01); *Y10T 74/18744* (2015.01)

(58) Field of Classification Search
CPC ..... F16H 25/20; F16H 25/22; F16H 25/2204; F16H 1/20; F16H 55/08; F16H 55/0806; F16H 2025/2081

USPC .............. 74/89.23, 424.81, 424.82, 457, 460, 74/412 R, 413, 421 A, 421 R; 384/590
See application file for complete search history.

(56) References Cited

U.S. PATENT DOCUMENTS 1,865,842 A * 7/1932 Davidson ...................... 384/588
2,403,092 A * 7/1946 Lear ......................... B64C 25/24
184/6

(Continued)

FOREIGN PATENT DOCUMENTS

JP          63-33026       3/1988
JP          08-100841      4/1996
(Continued)

*Primary Examiner* — William Kelleher
*Assistant Examiner* — Emily Cheng
(74) *Attorney, Agent, or Firm* — Harness, Dickey & Pierce, P.L.C.

(57) ABSTRACT

An electric linear actuator has a housing, an electric motor, a speed reduction mechanism, and a ball screw mechanism. The ball screw mechanism has a nut and a screw shaft. The nut is rotationally supported by bearings on the housing but is axially immovable. The screw shaft is rotationally supported on the nut and is axially movable with respect to the housing. The housing has a first housing and a second housing abutting against one another. Bores contain the screw shaft in the housing. The speed reduction mechanism has an input gear, an intermediate gear, and an output gear, secured on the nut, mating with the intermediate gear. The intermediate gear is rotationally supported, via a bearing, on a shaft. The shaft is supported at its opposite ends on the first and second housings.

9 Claims, 4 Drawing Sheets

(51) Int. Cl.
 *F16C 17/02* (2006.01)
 *F16C 33/12* (2006.01)

(56) References Cited

U.S. PATENT DOCUMENTS

| | | | | |
|---|---|---|---|---|
| 2,476,376 | A * | 7/1949 | Roland | B64C 25/24 254/103 |
| 4,274,292 | A * | 6/1981 | Arnett, Jr. | 74/6 |
| 4,998,346 | A * | 3/1991 | Behrens | F16C 13/006 29/898.061 |
| 5,063,808 | A * | 11/1991 | Hill | F16H 25/20 74/411.5 |
| 5,118,082 | A * | 6/1992 | Byun | B66F 3/20 254/102 |
| 6,240,797 | B1 * | 6/2001 | Morishima | F16H 25/2454 188/134 |
| 7,159,482 | B2 * | 1/2007 | Nagai | F16H 25/2204 74/89.25 |
| 7,703,983 | B2 * | 4/2010 | Tsutsui et al. | 384/279 |
| 2006/0093246 | A1 * | 5/2006 | Akita | E02F 9/006 384/279 |
| 2006/0093247 | A1 * | 5/2006 | Shimizu et al. | 384/279 |
| 2006/0205558 | A1 * | 9/2006 | Ploetz | F16C 21/00 475/331 |
| 2007/0051847 | A1 * | 3/2007 | Quitmeyer | F16H 25/205 244/99.2 |
| 2008/0289442 | A1 | 11/2008 | Kawada et al. | |
| 2009/0247365 | A1 * | 10/2009 | Di Stefano | B60T 13/02 477/197 |
| 2009/0277984 | A1 | 11/2009 | Wee et al. | |
| 2010/0178004 | A1 * | 7/2010 | Tsujimoto | F16C 19/386 384/564 |
| 2012/0108380 | A1 * | 5/2012 | Dinter | F03D 11/02 475/159 |
| 2012/0247240 | A1 * | 10/2012 | Kawahara | F16H 25/20 74/89.23 |
| 2014/0238168 | A1 * | 8/2014 | Ikeda | 74/89.23 |

FOREIGN PATENT DOCUMENTS

| | | |
|---|---|---|
| JP | 09-088965 | 3/1997 |
| JP | 2001-065575 | 3/2001 |
| JP | 2003-002219 | 1/2003 |
| JP | 2007-032703 | 2/2007 |
| JP | 2007-046637 | 2/2007 |
| JP | 2008-006868 | 1/2008 |
| JP | 2008-024052 | 2/2008 |
| JP | 2008-257145 | 10/2008 |
| JP | 2008-312433 | 12/2008 |
| JP | 2009-156416 | 7/2009 |
| JP | 2009-250316 | 10/2009 |
| JP | 2009-273378 | 11/2009 |
| JP | 2011-208767 | 10/2011 |

* cited by examiner

ELECTRIC LINEAR ACTUATOR

CROSS-REFERENCE TO RELATED APPLICATIONS

This application is a continuation of International Application No. PCT/JP2012/079311, filed Nov. 12, 2012, which claims priority to Japanese Application No. 2011-247259, filed Nov. 11, 2011. The disclosures of the above applications are incorporating herein by reference.

FIELD

The present disclosure relates to an electric actuator with a ball screw mechanism used in motors in general industries and driving sections of automobiles etc., and, more particularly, to an electric actuator used in a transmission or a parking brake to convert a rotary motion from an electric motor to a linear motion of a drive shaft, via a ball screw mechanism.

BACKGROUND

Gear mechanisms, such as a trapezoidal thread worm gear mechanism or a rack and pinion gear mechanism, have been used as a mechanism to convert a rotary motion of an electric motor to an axial linear motion in an electric linear actuator. These actuators are used in various kinds of driving sections. These motion converting mechanisms involve sliding contact portions. Thus, power loss is increased. Accordingly, this increases the size of the electric motors which, in turn, increases power consumption. Ball screw mechanisms have been widely adopted as more efficient actuators.

In an electric linear actuator of the prior art, an output member connected to a nut can be axially displaced by rotationally driving a ball screw shaft, forming a ball screw, with use of an electric motor supported on a housing. Since friction of the ball screw mechanism is very low, the ball screw shaft tends to be easily rotated in a reverse direction when a pushing thrust load is applied to the output member. Accordingly, it is necessary to hold the position of the output member when the electric motor is stopped.

An electric linear actuator has been developed where a brake mechanism is arranged for an electric motor or a low efficient mechanism, such as a worm gear, is provided as a power transmitting mechanism. In FIG. 5, one representative example is shown. It includes an actuator main body 52 with a ball screw 51 to convert the rotational motion to linear motion. A speed reduction mechanism 54 transmits the rotational motion of an electric motor 53 to the actuator main body 52 while reducing the rotational speed of the motor 53. A position holding mechanism 56 holds the position of the actuator main body 52 through its engagement with a first gear 55. The first gear 55 forms part of the speed reduction mechanism 54.

The ball screw 51 includes a screw shaft 57 that acts as an output shaft. It is formed with a helical screw groove 57a on its outer circumference. A nut 58 is fit on the screw shaft 57. The nut 58 is formed with a helical screw groove 58a on its inner circumference. A number of balls 59 are rollably contained in a rolling path formed by the opposite screw grooves 57a, 58a.

The actuator main body 52 includes the nut 58 rotationally supported on the inner circumference of a housing 60 by a pair of ball bearings 61, 62. The screw shaft 57 is axially movably supported but not rotationally relative to the housing 60. Thus, the rotational motion of the nut 58 driven by the speed reduction mechanism 54 can be converted to the linear motion of the screw shaft 57.

The speed reduction mechanism 54 includes the first gear 55 formed as a small spur gear fit on a motor shaft 53a of the electric motor 53. A second gear 63 mates with the first gear 55. The second gear 63 is integrally formed with the nut 58 as a large spur gear.

The position holding mechanism 56 includes a shaft 64 that functions as a locking member. The shaft 64 is adapted to engage with the first gear 55. A solenoid 65, functioning as a driving mechanism, engages and disengages the shaft 64 with the first gear 55. The shaft 64 has a rod-like configuration and is linearly driven by the solenoid 65. Thus, its tip end can be received in a recess 66. Since rotation of the first gear 55 can be prevented by the shaft 64, due to engagement of the shaft 64 with the first gear 55 by controlling the solenoid 65, it is possible to stably hold the position of the screw shaft 57 of the actuator main body 52. See, Patent Document 1: JP 2009-156416 A.

In the prior art electric linear actuator 50, since the rotation of first gear 55 can be firmly prevented by the shaft 64, due to the engagement of the shaft 64 with the first gear 55 by controlling the solenoid 65, it is possible to stably hold the position of the screw shaft 57 of the actuator main body 52 without causing any slippage between engaging surfaces.

However, it is believe that the control of the electric linear actuator 50 would be impossible in a case of power deficiency due to voltage drop of a battery. Under the circumstances, the nut 58 would be reversely rotated and continue the reverse rotation due to its inertia moment when a pushing thrust load is applied to the screw shaft 57. As the result, it is believed that the tip end of the screw shaft 57 would abut against an inner wall surface of the housing 60. Thus, this causes a lock up operation that would disable return of the screw shaft 57 by the electric motor 53 itself.

In addition, in the speed reduction mechanism 54, with a one-stage combination of the first gear 55 and second gear 63, it is also possible to adopt a two-stage combination. A shaft is provided between the motor shaft 53a and the screw shaft 57 when it is desired to have a large reduction ratio and to overcome a layout limitation of the speed reduction mechanism 54. In such a case, it is preferable to have a speed reduction mechanism with improved rotation performance while suppressing problems such as increase of manufacturing cost due to the increase of weight and the number of components.

SUMMARY

It is, therefore, an object of the present disclosure to provide an electric linear actuator with high rotational performance that can prevent the operation lock up of the ball screw and can be manufactured at a low cost.

To achieve the objects of the present disclosure, an electric linear actuator comprises a housing with an electric motor mounted on the housing. A speed reduction mechanism transmits the rotational power of the electric motor to a ball screw mechanism, via a motor shaft, to reduce the motor speed. The ball screw mechanism converts the rotational motion of the electric motor, transmitted via the speed reduction mechanism, to an axial linear motion of a drive shaft. The ball screw mechanism comprises a nut with a helical screw groove on its inner circumference. The nut is rotationally supported by rolling bearings on the housing. The nut is axially immovable. A screw shaft is coaxially integrated with the driving shaft. The screw shaft has a helical screw groove on its outer circumference that corresponds to the helical screw groove of the nut. The screw shaft is inserted into the nut, via a large number of balls. The screw shaft is rotationally supported on the housing but is axially immovable. The housing comprises a first housing and a second housing. The second housing is arranged with its end face abutted against the end face of the first housing. The electric motor is mounted on the first housing. The bores formed in the first and second housings, respectively, contain the screw shaft. The speed reduction mechanism comprises an input gear fit on the motor shaft. An intermediate gear mates with the input gear. An output gear, secured on the nut, mates with the intermediate gear. The intermediate gear is rotationally supported, via a rolling bearing, on a shaft. The shaft is supported at its opposite ends on the first and second housings.

The electric linear actuator of the present disclosure comprises a speed reduction mechanism that transmits the rotational power of the electric motor to a ball screw mechanism. The ball screw mechanism converts the rotational motion of the electric motor, transmitted via the speed reduction mechanism, to an axial linear motion of a drive shaft. The ball screw mechanism comprises a nut and a screw shaft. The nut is formed with a helical screw groove on its inner circumference. The nut is rotationally supported by a pair of rolling bearings on the housing but is axially immovable. The screw shaft is coaxially integrated with the drive shaft. The screw shaft is formed with a helical screw groove on its outer circumference that corresponds to helical screw groove of the nut. The screw shaft is inserted into the nut, via a large number of balls. The screw shaft is rotationally supported on the housing but is axially immovable. The housing comprises a first housing and a second housing. The second housing end face abuts against the end face of the first housing. The electric motor is mounted on the first housing. The bores formed in the first and second housings, respectively, contain the screw shaft. The speed reduction mechanism comprises an input gear fit on the motor shaft. An intermediate gear mates with the input gear. An output gear, secured on the nut, mates with the intermediate gear. The intermediate gear is rotationally supported, via a rolling bearing, on a shaft. The shaft is supported at its opposite ends on the first and second housings. The rotational force generated on the output gear by the screw groove of the ball screw can be smoothly transmitted toward a direction to relieve the rotational force. Thus, the locking up operation is also relieved due to the structure of the shaft freely rotationally supported by the rolling bearing. The supporting bearing of the first housing side is urged toward the second housing side due to the reaction caused by abutment of the screw shaft against the wall surface of the housing. Accordingly, a rotational force is caused on the output gear by the screw groove of the ball screw. Thus, it is possible to provide an electric linear actuator with low manufacturing cost that can avoid the locking up operation and has excellent rotational performance. In addition, since rolling bearings of the standard design can be adopted in consideration of the load capacity, manufacturing cost can be suppressed without an excessive increase in the number of components. A single rolling bearing is arranged within the intermediate gear. Thus, it is unnecessary to arrange both-side rolling bearings for the intermediate gear. Accordingly, it is possible to suitably and compactly bear a load applied on the intermediate gear without increasing the axial dimension of the electric linear actuator.

One end of the shaft is press-fit into the first or second housing. The other end of the shaft is loose-fit into the second or first housing. This makes it possible to assure smooth rotational performance with misalignment.

The rolling bearing of the intermediate gear is structured as a needle roller bearing of a shell type. It has an outer ring press-formed from steel sheet. It is press-fit into an inner circumference of the intermediate gear. A plurality of needle rollers is rollably contained in a cage. This makes it possible to use easily available popular needle roller bearings and thus reduce manufacturing cost.

An axial width of the needle roller bearing of the intermediate gear is set smaller than a whole axial width of the intermediate gear. This makes it possible to prevent the side surfaces of the needle roller bearing from being worn and deformed. This provides smooth rotational performance.

Ring-shaped flat washers are arranged at either side of the intermediate gear. A face width of the gear teeth of the intermediate gear is formed smaller than the whole axial width of the intermediate gear. This makes it possible to prevent the intermediate gear from directly contacting with the housing. Also, it reduces contacting area between the intermediate gear and the flat washers. Thus, this achieves smooth rotational performance while suppressing frictional resistance during rotation.

The flat washers are formed of austenitic stainless steel sheet. The flat washers are alternatively formed of thermoplastic synthetic resin impregnated with a predetermined amount of fiber reinforcing material. This makes it possible to increase strength and anti-wear property of the flat washers and thus to improve durability.

The bearing of the intermediate gear is formed of a sliding bearing that is structured as an oil impregnated bearing formed from porous metal with added fine graphite powder. The whole axial width of the sliding bearing is formed larger than the whole axial width of the intermediate gear. This makes it possible to prevent the intermediate gear from contacting the first and second housings and being worn without mounting any flat washers. This achieves smooth rotational performance while suppressing frictional resistance during rotation of the intermediate gear. Thus, this reduces the manufacturing cost while suppressing an increase in the number of components.

The sliding bearing is formed from a thermoplastic polyimide resin. This makes it possible to reduce the manufacturing cost of the electric linear actuator and improve the wear resisting performance.

The electric linear actuator of the present disclosure comprises a housing with an electric motor mounted on the housing. A speed reduction mechanism transmits the rotational power of the electric motor to a ball screw mechanism, via a motor shaft, while reducing motor speed. The ball screw mechanism converts the rotational motion of the electric motor, transmitted via the speed reduction mechanism, to an axial linear motion of a drive shaft. The ball screw mechanism comprises a nut and a screw shaft. The nut is formed with a helical screw groove on its inner circumference. The nut is supported by bearings on the housing but is rotationally axially immovable. The screw shaft is coaxially integrated with the driving shaft. The screw shaft is formed with a helical screw groove on its outer circumference that corresponds to helical screw groove of the nut. The screw shaft is inserted into the nut, via a large number of balls. The screw shaft is rotationally supported on the housing but is axially immovable. The housing comprises a first housing and a second housing. The second housing is arranged with its end face abutted against the end face of the first housing. The electric motor is mounted on the first housing. The bores formed in the first and second housings, respectively, contain the screw shaft. The speed reduction mechanism comprises an input gear fit on the motor shaft, an intermediate gear mating with the input gear, and an output gear, secured on the nut, mating with the intermediate gear. The intermediate gear is rotationally supported via a bearing on a shaft. The shaft is supported at its opposite ends on the first and second housings. The rotational force generated on the output gear by the screw groove of the ball screw can be smoothly transmitted toward a direction to relieve the rotational force. Thus, the locking up operation is also relieved due to the structure of the shaft being freely rotationally supported by the bearing. The supporting bearing of the first housing side is urged toward the second housing side due to a reaction caused by abutment of the screw shaft against the wall surface of the housing. Accordingly, rotational force is caused on the output gear by the screw groove of the ball screw. Thus, it is possible to provide an electric linear actuator of low manufacturing cost that can avoid the locking up operation and has excellent rotational performance. In addition, since standard design bearings can be adopted in consideration of the load capacity, manufacturing cost can be suppressed without an excessive increase in the number of components. Furthermore, it is unnecessary to arrange both-side bearings for the intermediate gear. A single bearing is arranged within the intermediate gear. Thus, it is possible to suitably and compactly bear a load applied on the intermediate gear without increasing the axial dimension of the electric linear actuator.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

To carry out the present disclosure, an electric linear actuator comprises a housing with an electric motor mounted on the housing. A speed reduction mechanism transmits the rotational power of the electric motor to a ball screw mechanism, via a motor shaft, while reducing motor speed. The ball screw mechanism converts the rotational motion of the electric motor, transmitted via the speed reduction mechanism, to an axial linear motion of a drive shaft. The ball screw mechanism comprises a nut and a screw shaft. The nut is formed with a helical screw groove on its inner circumference. The nut is rotationally supported by bearings on the housing but is axially immovable. The screw shaft is coaxially integrated with the driving shaft. The screw shaft is formed with helical screw groove on its outer circumference that corresponds to the helical screw groove of the nut. The screw shaft is inserted into the nut, via a large number of balls. The screw shaft is rotationally supported on the housing but is axially immovable. The housing comprises a first housing and a second housing. The second housing is arranged with its end face abutted against the end face of the first housing. The electric motor is mounted on the first housing. The bores formed in the first and second housings, respectively, contain the screw shaft. The speed reduction mechanism comprises an input shaft fit on the motor shaft, an intermediate gear mating with the input gear, and an output gear, secured on the nut, mating with the intermediate gear. The intermediate gear is rotationally supported, via a bearing on a shaft. The shaft is supported at its opposite ends on the first and second housings. Ring-shaped flat washers are arranged at either side of the intermediate gear. A face width of the gear teeth of the intermediate gear is formed smaller than the whole axial width of the intermediate gear.

Embodiments of the present disclosure will be described with reference to the drawings.

Figure 1:
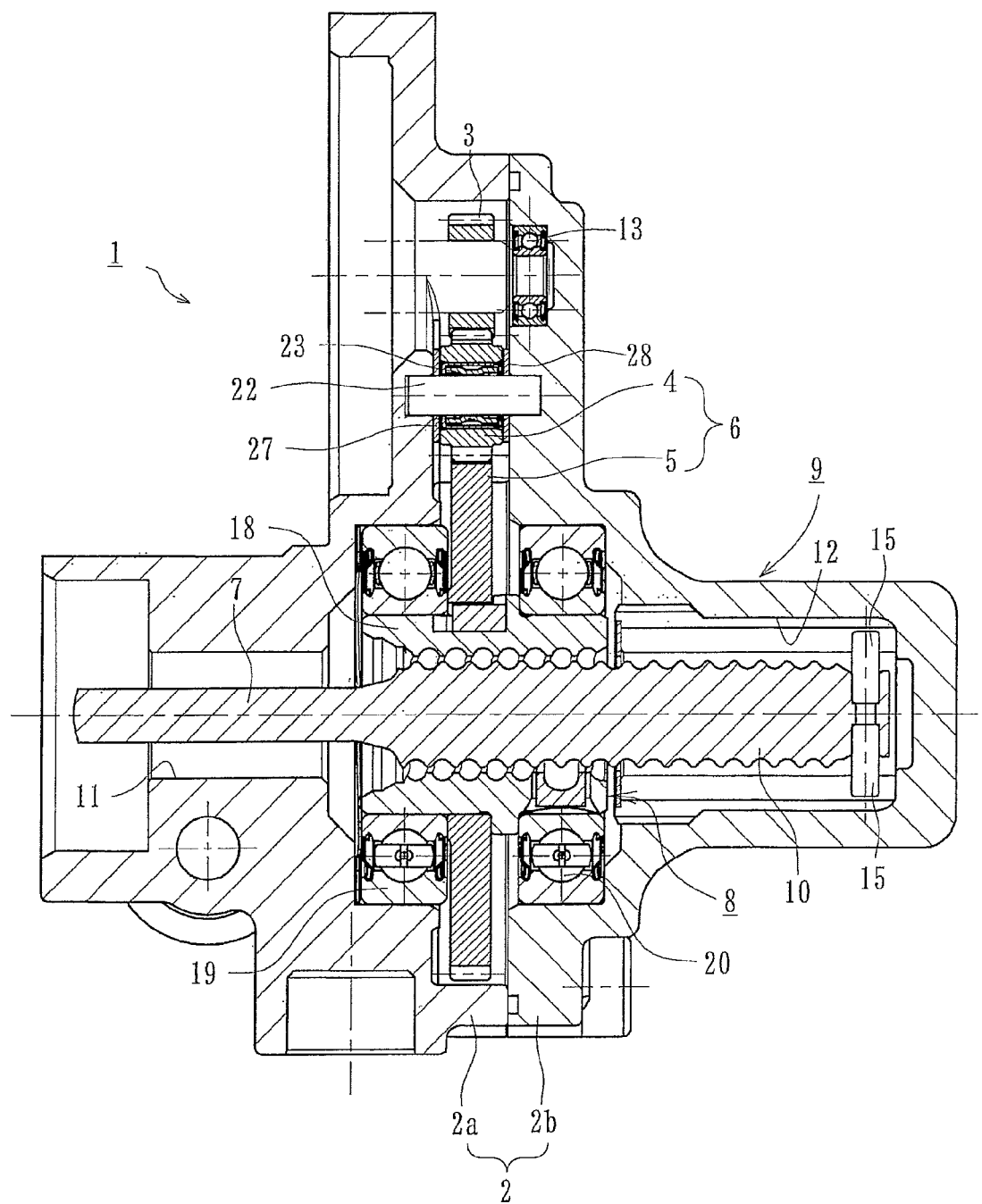
FIG. 1 is a longitudinal section view of a first embodiment of the electric linear actuator.
Figure 2:
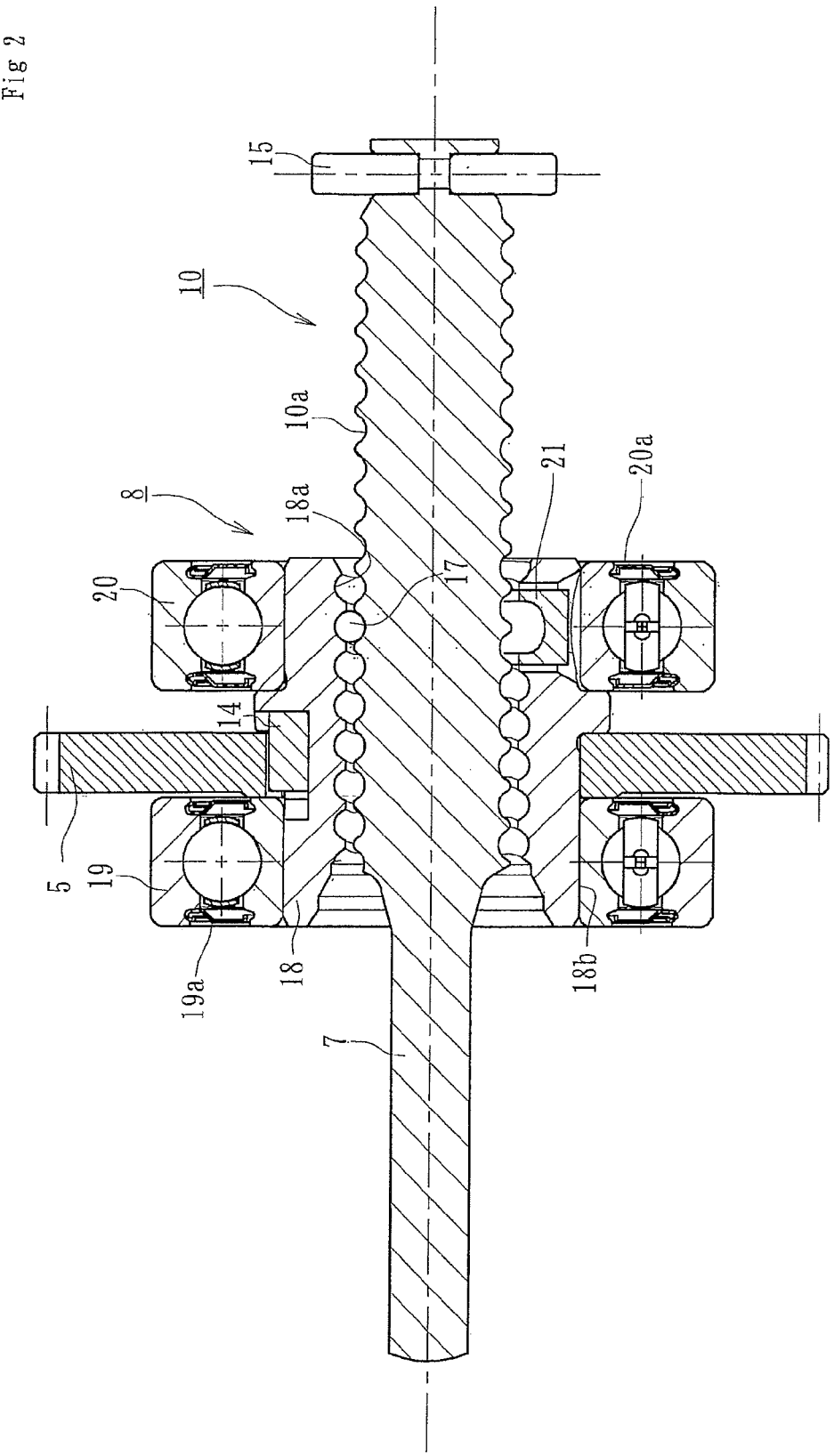
FIG. 2 is a longitudinal section view of an actuator main body of the electric linear actuator of FIG. 1.
Figure 3:
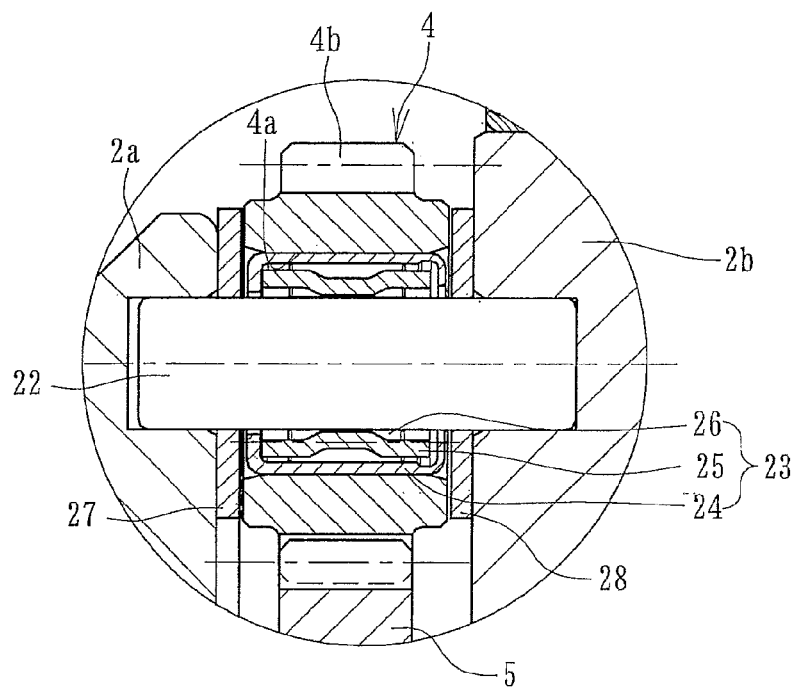
FIG. 3 is a partially enlarged view of an intermediate gear of the electric linear actuator of FIG. 1.
Figure 4:
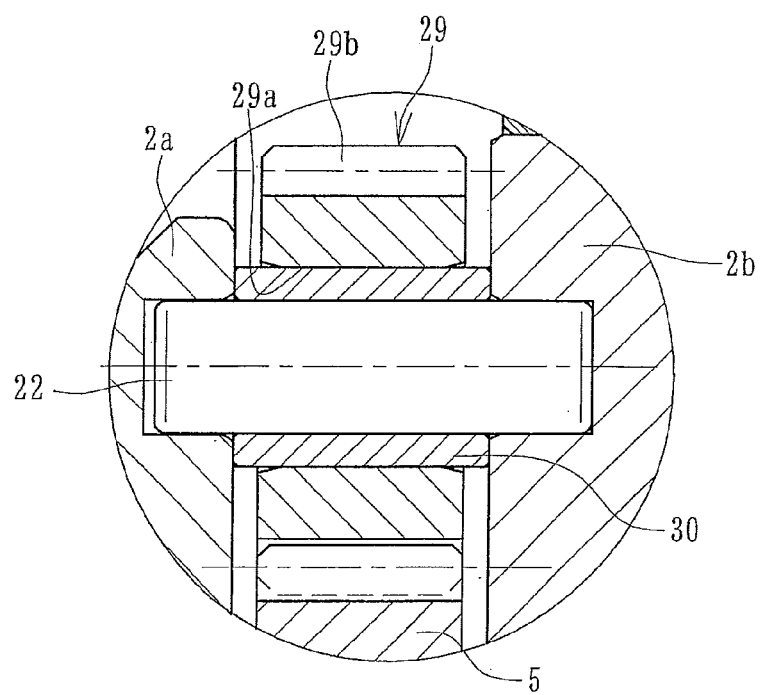
FIG. 4 is a partially enlarged view of a modification of the intermediate gear of FIG. 3.
Figure 5:
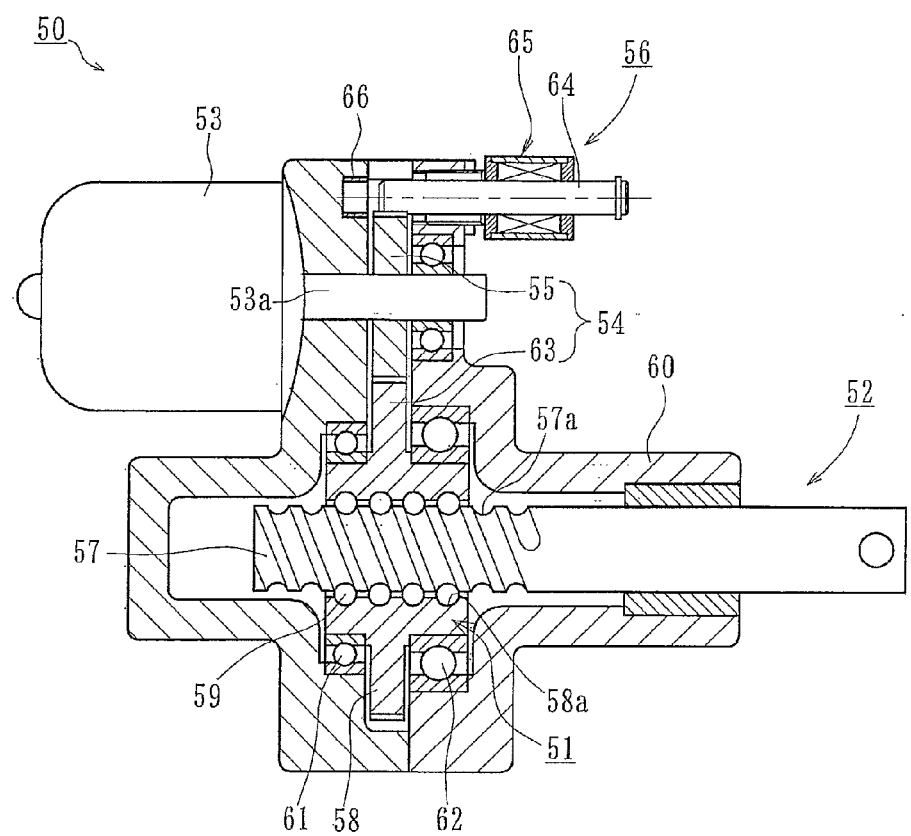
FIG. 5 is a longitudinal section view of a prior art electric linear actuator.

FIG. 1 is a longitudinal section view of a first embodiment of the electric linear actuator. FIG. 2 is a longitudinal section view of an actuator main body of the electric linear actuator of FIG. 1. FIG. 3 is a partially enlarged view of an intermediate gear of the electric linear actuator of FIG. 1. FIG. 4 is a partially enlarged view of a modification of the intermediate gear of FIG. 3.

As shown in FIG. 1, an electric linear actuator 1 includes a housing 2 formed from light aluminum alloy with an electric motor (not shown). An intermediate gear 4 mates with an input gear 3 mounted on a motor shaft (not shown) of the electric motor. A speed reduction mechanism 6, mounted in the housing, includes the intermediate gear 4, an output gear 5, and a ball screw mechanism 8. The ball screw mechanism 8 converts rotational motion of the electric motor to axial linear motion of a driving shaft 7, via the speed reduction mechanism 6. An actuator main body 9 includes the ball screw mechanism 8.

The housing 2 has a first housing 2a and a second housing 2b. They are assembled to abut with one another and be integrally secured to each other by fastening bolts (not shown). The electric motor can be mounted on the first housing 2a. An accommodating bore (through bore) 11 and an accommodating bore (blind bore) 12 accommodate a screw shaft 10. The accommodating bores 11, 12 are formed, respectively, in the first and second housings 2a, 2b.

The input gear 3 is mounted on an end of the motor shaft and is rotationally supported by a rolling bearing 13. The rolling bearing 13 is a deep groove ball bearing mounted on the second housing 2b. The output gear 5 mates with the intermediate gear 4. The output gear 5 is a spur gear integrally secured on a nut 18, via a key 14 (FIG. 2), that forms part of the ball screw mechanism 8.

The drive shaft 7 is integrated with the screw shaft 10 that forms a part of the ball screw mechanism 8. Engaging pins 15, 15 are arranged at one end (right side end in FIG. 1) of the drive shaft 7. The guide pins 15, 15 are engaged within a guide member mounted in the bore 12 of the housing 2b. The guide member is formed with axially extending guiding grooves to axially movably guide the screw shaft 10. The screw shaft is non-rotational.

As shown in the enlarged view of FIG. 2, the ball screw mechanism 8 includes the screw shaft 10 and the nut 18 fit onto the screw shaft 10, via balls 17. The screw shaft 10 is formed, on its outer circumference, with a helical screw groove 10a. The screw shaft 10 is axially movably supported but is not rotationally supported in the housing. On the other hand, the nut 18 is formed, on its inner circumference, with a helical screw groove 18a that corresponds to the helical screw groove 10a of the screw shaft 10. A number of balls 17 are rollably accommodated between these screw grooves 10a and 18a. The nut 18 is supported on the first and second housings 2a, 2b by two bearings 19, 20. The nut 18 rotates but is axially immovable relative to the housings 2a, 2b. The numeral 21 denotes a bridge member to continuously circulate balls 17 through the screw groove 18a of the nut 18.

The cross-sectional configuration of each screw groove 10a and 18a may be either one of a circular-arc or a Gothic-arc configuration. However, this embodiment adopts the Gothic-arc configuration. This is since it can have a large contacting angle with the ball 17 and a small axial gap. This provides a large rigidity against the axial load and suppresses the generation of vibration.

The nut 18 is formed of case hardened steel such as SCM415 or SCM420. Its surface is hardened to HRC 55~62 by vacuum carburizing hardening. This enables to omit treatments such as buffing for scale removal after heat treatment and thus reduces the manufacturing costs. On the other hand, the screw shaft 10 is formed of medium carbon steel such as S55C or case hardened steel such as SCM415 or SCM420. Its surface is hardened to HRC 55~62 by induction hardening or carburizing hardening.

The output gear 5, forming the reduction mechanism 6, is integrally secured on the outer circumference 18b of the nut 18. Two support bearings 19, 20 are press-fit onto either side of the output gear 5, via a predetermined interface. This makes it possible to prevent the generation of axial positional displacement between the supporting bearings 19, 20 and the output gear 5 even though a thrust load is applied to them from the drive shaft 7. In addition, each of the supporting bearings 19 and 20 is formed of a deep groove ball bearing of the sealed type. Shield plates 19a and 20a are arranged on either side of the support bearing to prevent leakage of grease contained in the bearings. Also, the plates prevent penetration of worn powder or debris into the bearings from the outside.

As shown in FIG. 3, the intermediate gear 4 is rotationally supported via a rolling bearing 23 on a shaft 22. The shaft 22 is supported at its opposite ends on the first and second housings 2a, 2b. A misalignment (assembling error) of the shaft 22 and the rolling bearing 23 can be provided. Smooth rotation of the intermediate gear 4 will be ensured, for example, by setting the end of the shaft 22 of second housing side, via a clearance or loose fit, and by setting the end of the shaft 22 of first housing side, via a press-fit. In the embodiment illustrated in FIG. 3, the rolling bearing 23 is formed by a needle roller bearing of a shell type. It includes an outer ring 24 press-formed from steel sheet and press-fit into an inner circumference of the intermediate gear 4. A plurality of needle rollers 26 are rollably contained in a cage 25. This enables adoption of standard design bearings in consideration of the load capacity. Thus, manufacturing costs can be also suppressed without an excessive increase in the number of components.

In addition, ring-shaped flat washers 27, 28 are arranged at either side of the intermediate gear 4. The flat washers 27, 28 prevent the intermediate gear 4 from directly contacting the first and second housings 2a and 2b. Furthermore, a face width 4b of the gear teeth of the intermediate gear 4 is formed smaller than the whole axial width of the intermediate gear 4. This makes it possible to reduce the contacting area between the intermediate gear 4 and the flat washers 27, 28. Thus, this achieves smooth rotational performance while suppressing frictional resistance during rotation. The flat washers 27, 28 are press-formed from austenitic stainless steel sheet (e.g. SUS304 of JIS) or preservative cold rolled steel sheet (e.g. SPCC of JIS). Alternatively, the flat washers 27, 28 may be formed of brass, sintered metal or thermoplastic synthetic resin, such as PA (polyamide) 66 etc. A predetermined amount of fiber reinforcing materials such as GF (glass fibers) etc. is impregnated in the resin.

In addition, an axial width of the rolling bearing 23 of the intermediate gear 4 is set smaller than a whole axial width of the intermediate gear 4. This makes it possible to prevent the side surfaces of the rolling bearing 23 from being worn and deformed. Thus, this obtains smooth rotational performance.

A modification of FIG. 3 is shown in FIG. 4. An intermediate gear 29 is rotationally supported, via a sliding bearing 30, on the shaft 22. The shaft 22 is supported at its opposite ends on the first and second housings 2a, 2b. According to this modification, a face width 29b of the gear teeth of the intermediate gear 29 is formed the same as the whole axial width of the intermediate gear 29. The sliding bearing 30 is structured as an oil impregnated bearing, e.g. "BEARFIGHT", registered trade mark of the production of NTN corporation, and press-fit into the inner circumference 29a of the intermediate gear 29. A whole axial width of the sliding bearing 30 is formed larger than the whole axial width of the intermediate gear 29. This makes it possible to prevent the intermediate gear 29 from contacting with the first and second housings 2a, 2b and becoming worn without mounting any flat washers. This achieves smooth rotational performance while suppressing frictional resistance during rotation of the intermediate gear 29. This reduces the manufacturing cost while suppressing an increase of the number of components. The sliding bearing 30 may be formed of thermoplastic polyimide resin to enable injection molding.

The electric linear actuator of the present disclosure can be applied to electric actuators used in an electric motor for general industries and driving sections of an automobile etc. The ball screw mechanism converts the rotational input from an electric motor to the linear motion of a drive shaft.

The present disclosure has been described with reference to the embodiments. Obviously, modifications and alternations will occur to those of ordinary skill in the art upon reading and understanding the detailed description. It is intended that the present disclosure be construed to include all such alternations and modifications insofar as they come within the scope of the appended claims or their equivalents.

What is claimed is:

1. An electric linear actuator comprising:
   a housing;
   an electric motor mounted on the housing;
   a speed reduction mechanism transmitting the rotational power of the electric motor to a ball screw mechanism, via a motor shaft, while reducing motor speed;
   the ball screw mechanism converting the rotational motion of the electric motor, transmitted via the speed reduction mechanism, to an axial linear motion of a drive shaft;
   the ball screw mechanism comprising a nut and a screw shaft, the nut has a helical screw groove on its inner circumference, the nut is rotationally supported by bearings on the housing, the nut is axially immovable with respect to the housing, the screw shaft is coaxially integrated with the drive shaft, the screw shaft has a helical screw groove on its outer circumference that corresponds to helical screw groove of the nut, the screw shaft is inserted into the nut, via a large number of balls, the screw shaft is axially movably supported on the housing, the screw shaft is non-rotatably supported with respect to the housing;
   the housing comprises a first housing and a second housing, the second housing is arranged with its end face abutting against an end face of the first housing, the electric motor is mounted on the first housing, bores formed in the first and second housings, respectively, containing the screw shaft;

the speed reduction mechanism comprises an input gear secured on the motor shaft, an intermediate gear mating with the input gear, and an output gear, secured on the nut, mating with the intermediate gear;

the intermediate gear is rotationally supported, via a bearing, on a shaft, the shaft is supported at its opposite ends on the first and second housings; and ring-shaped washers are arranged at either side of the intermediate gear, a face width of gear teeth of the intermediate gear is formed smaller than the whole axial width of the intermediate gear.

2. The electric linear actuator of claim 1, wherein one end of the shaft is press-fit into the first or second housing and the other end of the shaft is loose-fit into the second or first housing.

3. The electric linear actuator of claim 1, wherein the bearing of the intermediate gear is a needle roller bearing with an outer ring press-formed of steel sheet and press-fit into an inner circumference of the intermediate gear, and a plurality of needle rollers rollably contained in a cage.

4. The electric linear actuator of claim 3, wherein an axial width of the needle roller bearing of the intermediate gear is set smaller than a whole axial width of the intermediate gear.

5. The electric linear actuator of claim 1, wherein the ring-shaped washers are formed of austenitic stainless steel sheet.

6. The electric linear actuator of claim 1, wherein the ring-shaped washers are formed of thermoplastic synthetic resin impregnated with a predetermined amount of fiber reinforcing material.

7. An electric linear actuator comprising:
a housing;
an electric motor mounted on the housing;
a speed reduction mechanism transmitting the rotational power of the electric motor to a ball screw mechanism, via a motor shaft, while reducing motor speed;

the ball screw mechanism converting the rotational motion of the electric motor, transmitted via the speed reduction mechanism, to an axial linear motion of a drive shaft;

the ball screw mechanism comprising a nut and a screw shaft, the nut has a helical screw groove on its inner circumference, the nut is rotationally supported by bearings on the housing, the nut is axially immovable with respect to the housing, the screw shaft is coaxially integrated with the drive shaft, the screw shaft has a helical screw groove on its outer circumference that corresponds to helical screw groove of the nut, the screw shaft is inserted into the nut, via a large number of balls, the screw shaft is axially movably supported on the housing, the screw shaft is non-rotatably supported with respect to the housing;

the housing comprises a first housing and a second housing, the second housing is arranged with its end face abutting against an end face of the first housing, the electric motor is mounted on the first housing, bores formed in the first and second housings, respectively, containing the screw shaft;

the speed reduction mechanism comprises an input gear secured on the motor shaft, an intermediate gear mating with the input gear, and an output gear, secured on the nut, mating with the intermediate gear;

the intermediate gear is rotationally supported, via a bearing, on a shaft, the shaft is supported at its opposite ends on the first and second housings; and the bearing of the intermediate gear is formed as a sliding bearing structured as an oil impregnated bearing formed from porous metal with added fine graphite powder, and a whole axial width of the sliding bearing is formed larger than the whole axial width of the intermediate gear.

8. The electric linear actuator of claim 7, wherein the sliding bearing is formed of thermoplastic polyimide resin.

9. The electric linear actuator of claim 7, wherein one end of the shaft is press-fit into the first or second housing and the other end of the shaft is loose-fit into the second or first housing.

* * * * *